US012750429B2

(12) United States Patent
Frehse

(10) Patent No.: US 12,750,429 B2
(45) Date of Patent: Sep. 29, 2026

(54) DATA BROKER AND METHOD

(71) Applicant: HiveMQ GmbH, Landshut (DE)

(72) Inventor: Stefan Frehse, Landshut (DE)

(73) Assignee: HiveMQ GmbH, Landshut (DE)

( * ) Notice: Subject to any disclaimer, the term of this patent is extended or adjusted under 35 U.S.C. 154(b) by 166 days.

(21) Appl. No.: 18/669,387

(22) Filed: May 20, 2024

(65) Prior Publication Data

US 2025/0358344 A1 Nov. 20, 2025

(51) Int. Cl.
*H04L 67/55* (2022.01)
*H04L 67/562* (2022.01)

(52) U.S. Cl.
CPC ............ *H04L 67/55* (2022.05); *H04L 67/562* (2022.05)

(58) Field of Classification Search
None
See application file for complete search history.

(56) References Cited

U.S. PATENT DOCUMENTS

2020/0287974 A1 * 9/2020 Gnessin ................ H04L 67/142

OTHER PUBLICATIONS

Stefan Frehse, Leveraging Behavior Model MQTT Communication to optimize LoT deployments (Year: 2023).*
Leveraging Behavior Model on MQTT Communication to Optimize IoT Deployments, HiveMQ, Dec. 5, 2023.
What's New in HiveMQ 4.20?, HiveMQ, Sep. 25, 2023.
Policies—HiveMQ Documentation, HiveMQ, Sep. 25, 2023.
Transformation scripting with JavaScript, Publish Object—XP093315680, HiveMQ, Feb. 29, 2024 https://web.archive.org/web/20240229190858/https:/docs.hivemq.com/hivemq/latest/data-hub/transformations.html.
Extended European Search Report dated Oct. 1, 2025 for European Patent Application No. 25177438.6.

* cited by examiner

*Primary Examiner* — Cai Y Chen
(74) *Attorney, Agent, or Firm* — EIP US LLP

(57) ABSTRACT

A method performed at a data broker comprises receiving from a subscriber client a request for a subscription for sensor data transmitted by a sensor client, the request in accordance with a publish/subscribe messaging protocol, receiving sensor data from the sensor client, the sensor data published by the sensor client in accordance with the messaging protocol, and determining, in dependence on the sensor data and a current state of a state machine associated with the sensor client, whether the sensor data is to be subject to subscription processing. The method further comprises determining, in dependence on the receipt of the sensor data and the current state of the state machine, an updated state for the state machine, updating the state machine to the updated state, and if the data is to be subject to subscription processing, forwarding the data to the subscriber client in accordance with the messaging protocol.

17 Claims, 7 Drawing Sheets

DATA BROKER AND METHOD

BACKGROUND

Technical Field

The present disclosure relates to the operation of a data broker in a publish/subscribe messaging system.

Background

In order to coordinate the communication of data between numerous data sources and entities which make use of that data, a data broker may act as an intermediary by maintaining a record of subscriber clients who wish to receive data transmitted by publisher clients (which may be, for example, sensor data generated at a remote device). The use of a data broker can produce a faster and more efficient communication system, by eliminating the need for direct communication between the publisher and subscriber clients.

A feature of a publish/subscribe architecture is that a publisher client may not be aware of the identity, or even existence, of any subscriber client which has established a connection for its published data.

Publisher clients may be remote, connected by low capacity data links, have limited access to power, and/or may be connected to the data broker only intermittently. Publisher clients may operate in a manner (such as, according to protocols or software) which cannot be modified after manufacture or after deployment. For publisher clients whose behaviour can be subsequently modified, the scope and possibility for such modifications may be restricted. For example, a sensor device which connects to the data broker via a low bandwidth wireless communication link (for example, one using a 3GPP-specified protocol for internet-of-things, IoT, communications) may not be able to receive or process commands to modify its behaviour. As another example, sensor data generated by sensors on vehicles may be generated and published according to software which can only be updated when a vehicle is physically connected to a mechanic's computer system.

Thus, it may not be possible to change dynamically the behaviour of the publisher clients.

SUMMARY

According to a first aspect, there is provided a computer-implemented method performed at a data broker, a further computer-implemented method and a data broker apparatus configured to perform the computer-implemented methods. Also provided is computer program product (such as one or more non-transient storage media) comprising instructions to perform the computer-implemented method.

The method includes receiving from a subscriber client a request for a subscription for sensor data transmitted by a first sensor client, the request in accordance with a publish/subscribe messaging protocol, receiving first sensor data from the first sensor client, the first sensor data published by the first sensor client in accordance with the messaging protocol. The method further includes determining, in dependence on the first sensor data and a current state of a state machine associated with the first sensor client, whether the first sensor data is to be subject to subscription processing, and an updated state for the state machine. The method includes updating the state machine to the updated state and, if the first data is to be subject to subscription processing, forwarding the data to the subscriber client in accordance with the messaging protocol.

The further method includes receiving a message from a client in accordance with a publish/subscribe messaging protocol, determining whether the message is within a category of messages associated with a state machine, a current state of the state machine reflecting the previous reception by the data broker of one or more messages within the category of messages, if the message is within the category of messages then determining, based on the receiving the message, an updated state for a state machine and a function to be executed. The method includes updating the state machine to the updated state and performing the function.

There is thus provided an improved data broker.

Further features and advantages will become apparent from the following description of implementation details, given by way of example only, which is made with reference to the accompanying drawings.

DETAILED DESCRIPTION

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Examples of the present disclosure relate to processing messages received at a data broker in a publish/subscribe system. In particular, examples described herein address problems related to undesired or unexpected behaviour of publisher clients, or provide an otherwise improved publish/subscribe data broker.

Figure 1:
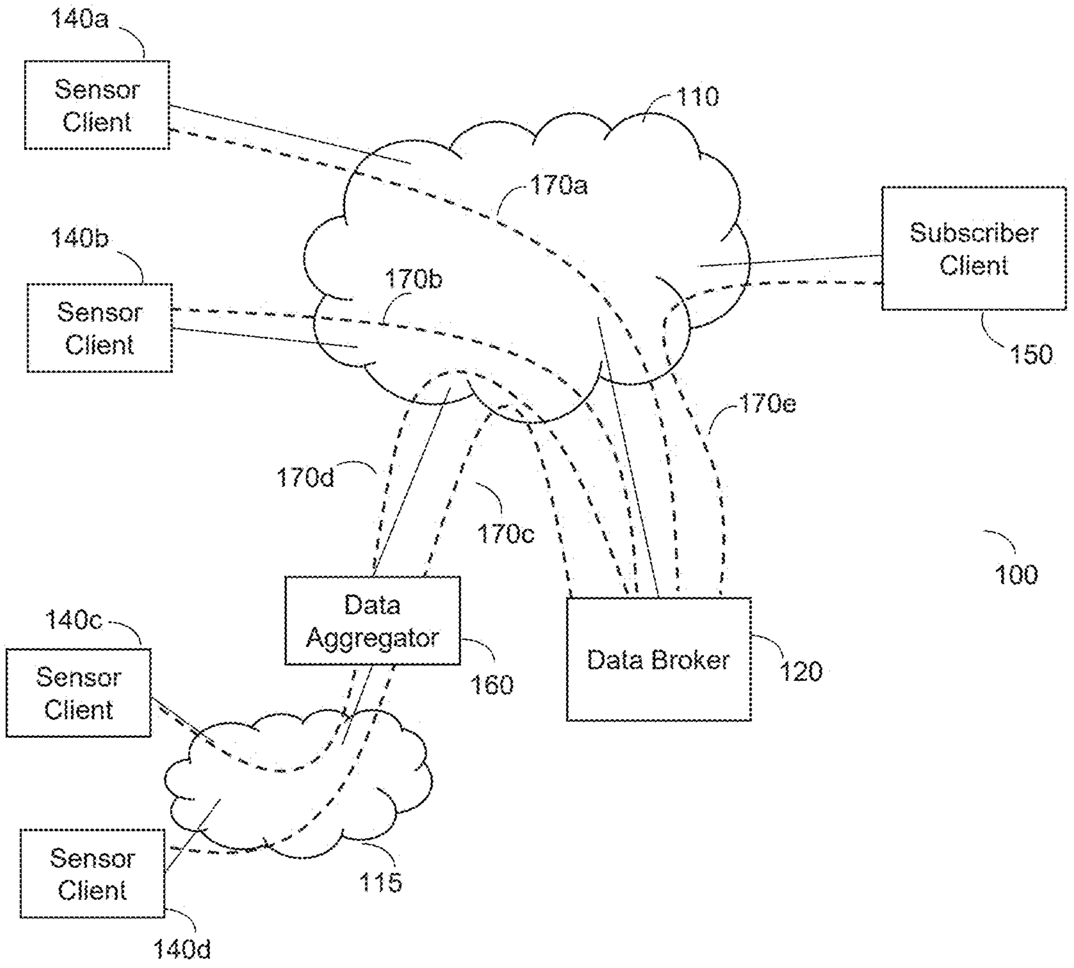
FIG. 1 shows a network architecture within which examples may be implemented.

FIG. 1 shows a network architecture 100 within which examples of the present disclosure may be implemented.

The network architecture 100 includes a first communications network 110, which connects a data broker 120 and clients 140*a-d*, 150. Certain clients 140*a-d* generate data which is transmitted (or 'published') to the data broker 120. Examples of such clients are sensor devices, measuring devices, or other sources of sensor data. The sensor clients 140*a-d* may be Internet-of-Things devices. The sensor data may be machine-type communication (MTC) data.

A client which has requested a subscription at the data broker 120, to receive data from the data broker 120, is referred to herein as a 'subscriber client'. Subscriber clients receive data, such as sensor data published by sensor clients 140*a-d*, from the data broker 120.

In the example of FIG. 1, sensor clients 140*a*, 140*b* connect directly to the data broker 120 via the communications network 110, while other sensor clients 140*c*, 140*d* connect indirectly, via a second communications network 115 and a data aggregator 160. The data aggregator 160 is connected to the data broker 120 via the first communications network 110. A subscriber client 150 connects to the data broker 120 via the first communications network 110.

A client may both transmit data towards the data broker 120 and receive data from the data broker 120. Such a client is both a subscriber client and a sensor client.

The data aggregator 160 is connected to both the first communications network 110 and the second communications network 115 and relays data and control messages between the sensor clients 140*c*, 140*d* and the data broker 120.

The communications networks 110, 115 may each comprise one or more different physical networks which are interconnected. For example, and without limiting the scope of the present disclosure, the first communications network 110 may comprise a wireless communications network operating according to a wireless communications specification, such as in accordance with the 3GPP 2G (GSM/GPRS/EDGE), 3G (UMTS), 4G (LTE) or 5G (NR) standards or in accordance with an IEEE 802.11 standard. One or more of the sensor clients 140*a*, 140*b*, subscriber client 150, data aggregator 160 and data broker 120 may comprise wireless communications functionality, such as radio frequency transceivers, and one or more antennae. The first communications network 110 may comprise one or more wired or wireless communications networks, which interoperate to provide end-to-end connectivity between the data broker 120 and the sensor clients 140*a*, 140*b*, subscriber client 150 and the data aggregator 160. This end-to-end connectivity may be in part provided by the internet. The first communications network 110 provides for the transport of internet protocol (IP) packets according to the IP version 4 or IP version 6 specifications or other suitable standard.

The second communications network 115 may use the same or different technologies as the first communications network 110. Communications within the second communications network 115 may use a communications protocol such as Zigbee or Bluetooth.

The second communication network 115 may be a private network, to which access is restricted. For example, connections to the second communications network 115 may be restricted to devices (such as sensor clients 140*a*, 140*b*) which are owned by, or controlled by, a particular entity or organisation. For example, a manufacturer may restrict access to the second communications network 115 to equipment within a particular manufacturing facility.

It is to be understood that the arrangement of sensor clients, subscriber clients and data brokers shown in FIG. 1 is for the purpose of illustration without suggesting any limitations. There may be fewer, or more, sensor clients, subscriber clients and data brokers than are shown in FIG. 1. Similarly, the network topology is for illustration, and in some examples, there may be only one communications network or there may be more than two communications networks. In some cases, there may be a direct connection between entities. For example, the data aggregator 160 may be connected directly to the data broker 120 by a point-to-point link. Where all entities are connected via such point-to-point links, there may be no communications network.

The data broker 120 is connected (directly or indirectly) to many sensor clients and to many subscriber clients. In the example of FIG. 1, the data broker 120 and clients are connected via respective logical point-to-point connections 170. Data, such as sensor data, is transmitted via these logical point-to-point connections 170.

The logical point-to-point connections 170 may be established in accordance with a messaging protocol, such as MQTT or MQTT-SN and may operate over a network connection using a transport protocol such as TCP/IP or UDP. These point-to-point connections 170 may use appropriate security techniques to ensure the confidentiality and/or integrity of transmissions. Where a logical point-to-point connection runs over TCP/IP, these security techniques may include, for example, one of the Transport Layer Security (TLS) protocols.

In the example of FIG. 1, logical point-to-point connections 170*a*, 170*b*, 170*e* are MQTT connections carried via respective TCP/IP connections over the first communications network 110.

Logical point-to-point connections 170*c*, 170*d* extend between the data broker 120 and respective sensor clients 140*c*, 140*d*, via the data aggregator 160. In the example of FIG. 1, the second network 115 is unsuitable for, or not capable of, supporting a reliable connection-oriented transport protocol such as TCP/IP. Instead, transmissions over the second communications network 115 between the data aggregator 160 and sensor clients 140*c*, 140*d* are via MQTT-SN connections, whose transmissions are sent using the user datagram protocol (UDP). The logical connections 170*c*, 170*d* are thus formed of the concatenation of an MQTT-SN connection and an MQTT connection.

The data aggregator 160 provides an interworking function, to permit the end-to-end operation of logical connections 170*d*, 170*e* between the data broker 120 and clients 140*c*, 140*d*. In response to receiving an MQTT message via the first network 110, a suitable MQTT-SN message is generated at the data aggregator 160 and transmitted to the appropriate client via the second communications network 115, and vice versa. Accordingly, the data aggregator 160 permits the use of a publish/subscribe mechanism for clients when they (or the network to which they are connected) do not support TCP/IP, or otherwise do not support MQTT. In the example of FIG. 1, the data aggregator 160 performs the function of an MQTT-SN gateway.

Security techniques for the transmission of data and control messages via the first communications network 110 may be different from those (if any) security techniques used for transmissions within the second communications network 115.

In general, the transmission of data (publishing) and of control messages (for example, subscription requests, connection requests, disconnection requests, unsubscribe requests) may be in accordance with a suitable protocol or standard. In some examples, a first communications protocol or standard may be used for communications with entities (such as sensor clients 140*a*, 140*b*, subscriber client 150, and data aggregator 160) which communicate directly with the data broker 120, and a second communications protocol or standard may be used for communication between the data aggregator 160 and the sensor clients 140*c*, 140*d*, which are connected via the second communications network 115. As described above, in the example of FIG. 1, the first protocol is the MQTT protocol and the second protocol is the MQTT-SN protocol.

References to particular network technologies, standards or specifications herein are not intended to be limiting and it will be appreciated that the examples of the present disclosure may be implemented in accordance with any suitable standards, including ones which are developed in the future.

The system illustrated in FIG. 1 is a 'publish/subscribe' architecture. That is, the data broker 120 receives data which has been published (that is, transmitted towards the data broker 120) by each of the sensor clients 140 and forwards it to any subscriber client 150 which has subscribed to receive that data. A subscriber client 150 may subscribe to receive certain data by sending a 'SUBSCRIBE' control message to the data broker 120.

The use of a publish/subscribe architecture may avoid the need for subscriber clients to connect to each sensor client of interest, can reduce transmissions over the communications networks, and can simplify the implementation (with accordingly reduced processing requirements) for sensor clients and subscriber clients.

Figure 2:
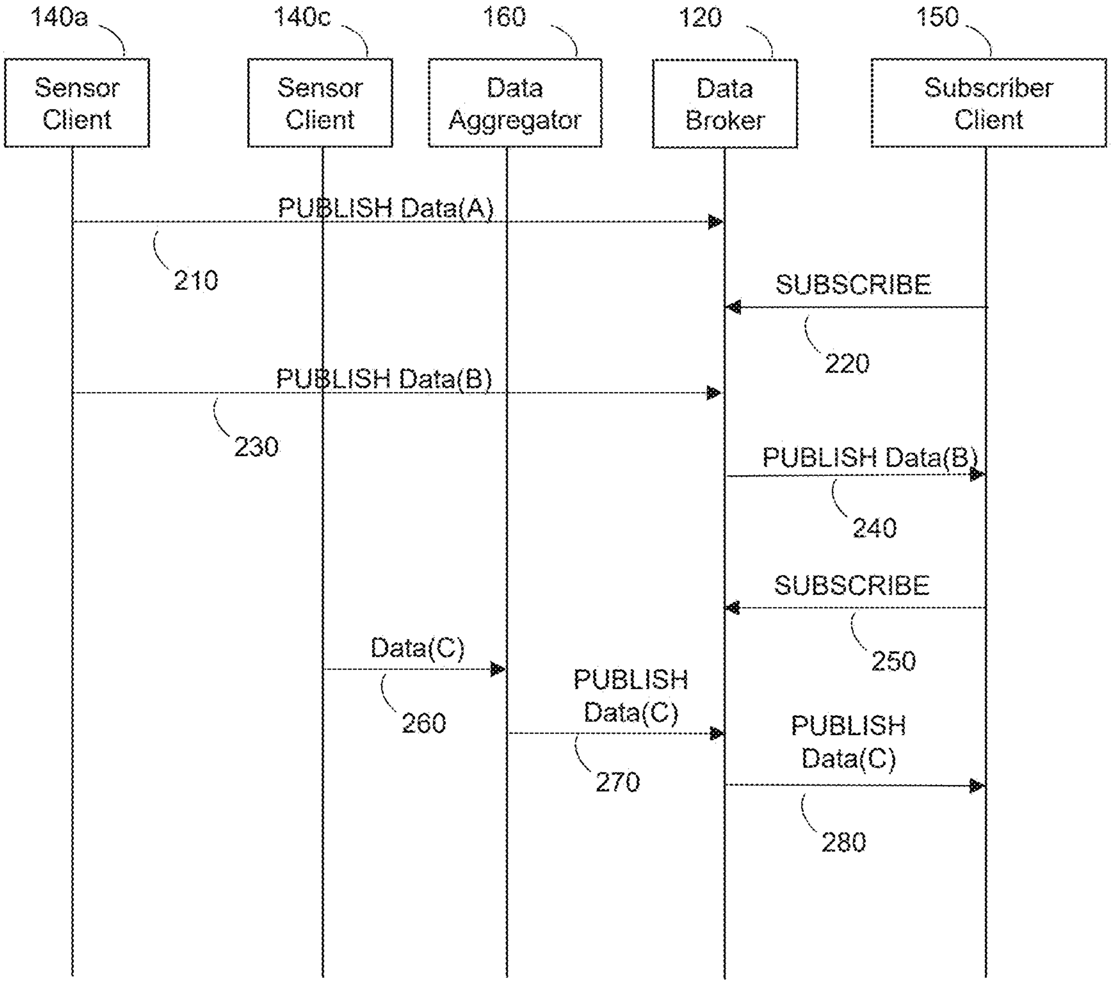
FIG. 2 is a message sequence chart showing an example of data and control messages sent in the network of FIG. 1 in accordance with a conventional publish/subscribe approach.

FIG. 2 is a message sequence chart showing an example of data and control messages sent in the network of FIG. 1 in accordance with the publish/subscribe approach.

Initially (not shown), each of the sensor clients 140*a*, 140*c*, and subscriber client 150 have established respective point-to-point connections 170 with the data broker 120 in accordance with the MQTT or MQTT-SN standards. Accordingly, sensor client 140*c* is able to send data to the data broker 120 via the data aggregator 160.

Sensor client 140*a* sends first data (A) to the data broker 120 in an MQTT PUBLISH message 210. Because no subscriber client has requested a subscription to this data, the data broker 120 discards the data.

Subsequently, subscriber client 150 sends an MQTT SUBSCRIBE message 220 to the data broker 120. This requests that data received by the data broker 120 be forwarded to it: specifically, the SUBSCRIBE message 220 requests the forwarding of data generated by the first sensor client 140*a*. In other words, by sending the SUBSCRIBE message 220, the subscriber client 150 requests a subscription to data published by sensor client 140*a*.

On receipt of the SUBSCRIBE message 220, the data broker 120 updates its subscription records accordingly.

Sensor client 140*a* subsequently sends second data (B) to the data broker 120 in a second PUBLISH message 230. Based on its stored subscription records, the data broker 120 determines which, if any, subscriber client has subscribed to this data. Because subscriber client 150 has requested a subscription to this data, the data broker 120 forwards the second data (B) to the subscriber client 150 in an MQTT PUBLISH message 240.

The subscriber client 150 then sends a second SUBSCRIBE message 250 to the data broker 120 requesting a subscription to data generated and published by sensor client 140*c*. The data broker 120 updates its subscription records accordingly.

Sensor client 140*c* then sends third data (C) to the data aggregator 160 in data transmission 260, in the form of an MQTT-SN PUBLISH message. In response, the data aggregator 160 forms an MQTT PUBLISH message 270 comprising the third data (C). This PUBLISH message 270 is then transmitted to the data broker 120.

The data broker 120 determines which, if any, subscriber client has subscribed to this data. Because subscriber client 150 has requested a subscription to this data, the data broker 120 forwards the third data (C) in an MQTT PUBLISH message 280 to the subscriber client 150.

PUBLISH messages 210, 230, 240, 260, 270, 280 may comprise an indication of a topic, to allow for different handling for different types of data generated by the respective sensor clients 140.

Accordingly, a subscription may be at a granularity of a particular sensor client, a particular topic (irrespective of the sensor client that published the data), or a particular subset of data generated by a particular sensor. For example, a temperature sensor may transmit data every 5 minutes representing a current temperature and further data every 24 hours an average temperature measured over the previous 24 hour time period. Data may therefore be associated with a 'current temperature' topic or an 'average temperature' topic. A subscriber client may subscribe to data from the sensor, and may selectively subscribe to one or both topics. A subscriber client may alternatively subscribe to all data with a topic of 'current temperature' so that it receives all current temperature measurements, regardless of which client generated the data.

Particular data received at the data broker 120 may fall within the scope of multiple subscriptions associated with one or more subscriber clients. In this case, the data broker 120 generates multiple PUBLISH messages and transmits these to all subscriber clients having a subscription to that data.

In addition to the data messages shown in FIG. 2, other control messages may be transmitted. These may relate to the establishment, maintenance, or release of point-to-point connections 170, may acknowledge receipt of a data transmission or acknowledge receipt of an earlier control message, or may relate to other aspects of the publish/subscribe messaging protocol in use.

Figure 3:
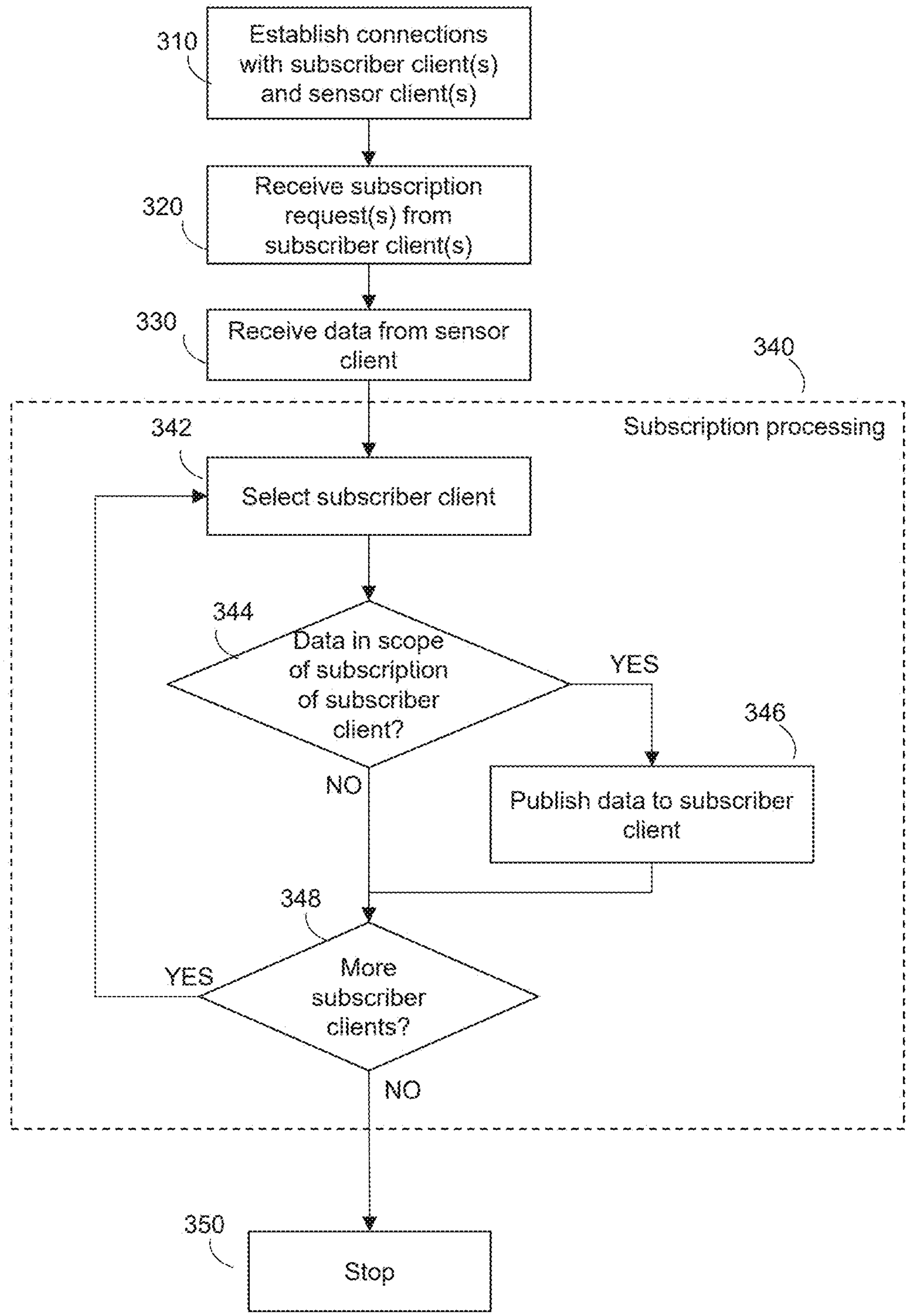
FIG. 3 is a flow chart for a process at a conventional message broker.

FIG. 3 is a flow chart for a process at a conventional message broker, such as the message broker 120 shown in FIG. 1.

The process starts at step 310, in which the data broker 120 establishes connections 170 with one or more subscriber clients 150 and with one or more sensor clients. Connections with sensor clients 140 may be direct connections or indirect connections via the data aggregator 160.

At step 320, the data broker receives one or more subscription requests from subscriber clients 150. As described above, each subscription request defines characteristics of data messages which the subscriber wishes to receive. The data broker updates its subscription records to reflect the newly-requested subscription(s).

At step 330, the data broker 120 receives, from a sensor client, a data message (in the form of a PUBLISH message) comprising data. The data message may have been transmitted by the sensor client, by a device comprising the sensor client, or by the data aggregator 160 in response to receiving the data via the second communications network 115. The data message comprises data and may indicate a topic associated with the data.

At step 340, the data broker 120 performs subscription processing for the data message. In carrying out step 340, the data broker 120 transmits a copy of the data, together with an indication of any topic associated with the data, to any subscriber clients having a subscription that encompasses the data. FIG. 3 shows an example sequence of steps suitable for carrying out the subscription processing, without limiting the scope of the present disclosure.

At step 342, the data broker 120 selects a subscriber client of those with established connections to the data broker. The process continues at step 344 at which the data broker determines, based on its subscription records, whether the data is within the scope of any subscription of the selected subscriber client.

If not ('NO') then control passes to step 348.

Otherwise, ('YES') control passes to step 346 in which the data broker 120 transmits a data message (for example, in the form of a PUBLISH message) comprising the data and, optionally, an indication of the topic and/or an indication of the sensor client from which the data was received. The data message may be transmitted via a connection 170 to the selected subscriber client. Control then passes to step 348.

At step 348, the data broker 120 determines whether there are more subscriber clients to consider. If so ('YES'), control returns to step 342, at which a next subscriber client is selected, and the subsequent steps are performed as described above.

If there are no more subscriber clients ('NO') then control passes to step 350 and the process ends.

The process shown in FIG. 3 may be restarted from any of steps 310, 320, or 330. For example, if the data broker 120 receives a further subscription request, the process may be restarted at step 320.

The steps may be repeated as necessary and may be performed in a different order than as shown in FIG. 3. In some examples, one or more steps may be omitted.

In some examples, some or all of the subscription processing is carried out asynchronously with respect to, for example, step 330. For example, in response to determining 'YES' at step 344, data for transmission to the subscriber client may be added to a queue, together with an indication of the identity of the subscriber. The queue may be processed (including step 346) independently of the addition of further data to the queue.

In some examples, the data is associated with particular quality of service requirements, and the data broker ensures that these are satisfied. For example, a first quality of service requirement may be that where multiple data messages are received from a particular sensor client, associated with the same topic and for forwarding to the same subscriber client, the corresponding PUBLISH messages are transmitted at step 346 in the same sequence as the receipt of the corresponding messages at step 330. This may be ensured by processing this data from the queue in a first-in, first-out (FIFO) approach.

The procedures illustrated in FIG. 2 and FIG. 3 provide for a very flexible and scalable solution, allowing for the efficient transmission and dissemination of data in diverse applications.

As described above, a single device may act as a sensor client and as a subscriber client. Furthermore, a single device may comprise any number of sensor clients and any number of subscriber clients. An example of such a device is a vehicle.

Figure 4:
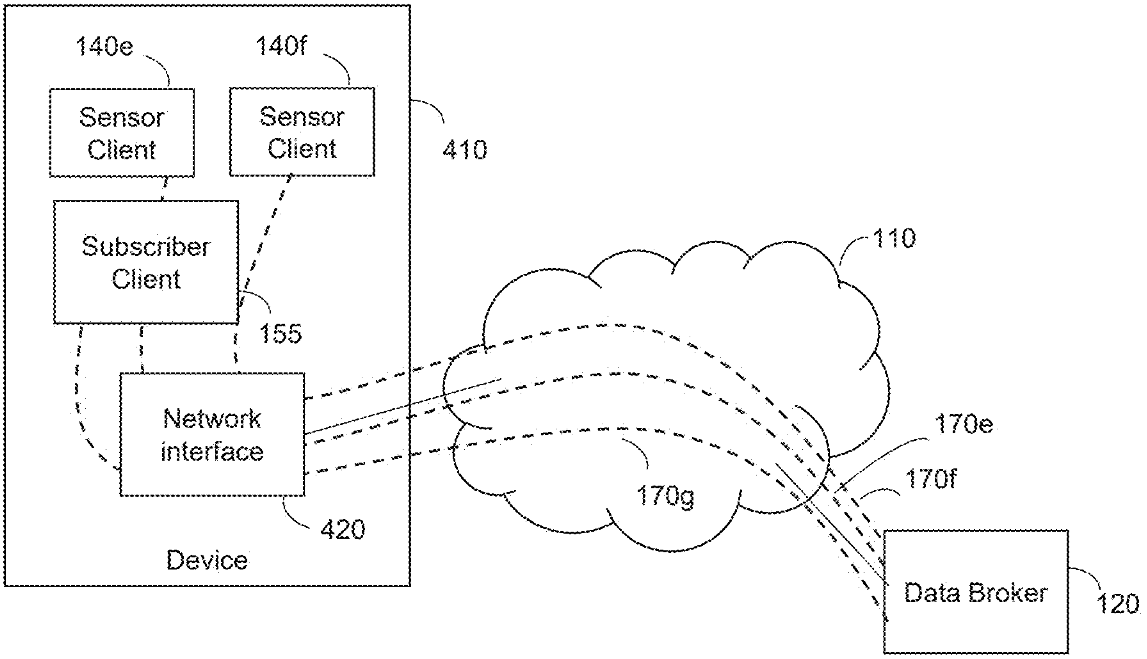
FIG. 4 illustrates an example of a single device which comprises sensor clients and a subscriber client in accordance with examples.

FIG. 4 illustrates an example of a single device 410 which comprises two sensor clients 140*e*, 140*f* and a subscriber client 155 in accordance with an example. In some examples, the device 410 may include a single communications interface 420 which transmits and receives signals via the first and/or second communications networks 110, 115, so that data and control signalling can be transmitted between the device 410 and the data broker 120.

In FIG. 4, each client has a single logical connection 170*e*, 170*f*, 170*g* with the data broker 120. However, in some examples, there may be a different number of logical connections.

In an example, the subscriber client 155 may request a subscription at the data broker 120 for data relating to software updates suitable for the device 310.

An important feature of a publish/subscribe architecture is that clients that publish data are not aware of the existence of clients that subscribe to their data and vice versa. Data communications is generally unidirectional: a subscriber client cannot respond to a sensor client based on the receipt of data. Although in practice sensor clients may be configured to generate data in accordance with particular rules, conventional publish/subscribe protocols do not permit correcting or adjusting the behaviour of a sensor client in response to the receipt of data that is generated in a particular undesirable way, either due to a malfunction, misconfiguration, or other unexpected operation at the sensor client. A subscriber client may therefore receive unnecessary or otherwise undesirable data.

A conventional data broker processes data messages and control messages independently of previously-received messages (other than to the extent required to enforce quality of service constraints requiring in-order delivery). While this can simplify the operation of the data broker and reduce complexity and processing requirements, there may be scenarios where it is beneficial to identify, and be able to react to, aspects of the behaviour of a sensor client (or of multiple sensor clients) that are not possible at a conventional data broker.

There is, accordingly, a need to provide an improved messaging system.

In accordance with examples of the present disclosure, the data broker monitors received messages from sensor clients and maintains and updates a state machine based on the received messages. The state machine may define actions, or functions, which are carried out based on the received messages and (in some cases) on the current state of the state machine. The functions may modify the flow of data messages to subscribers (including discarding messages), may create new data or control messages, modify a control message, or perform other control functions related to the operation of the data broker with respect to the sensor clients or subscriber clients.

In some examples, the state machine may enable the detection and/or notification of the certain behaviour of the sensor client, and in particular the detection and/or notification of unexpected or undesirable behaviour. The state of the state machine may be determined by data messages or control messages received from one or more clients.

Accordingly, it is possible for the data broker to detect that a sequence of one or more messages has been received from the sensor client(s) which meet certain pre-determined criteria. These criteria may relate to the receipt of certain messages, the lack of receipt of certain messages, or a combination of these.

Suitable actions may be taken in response. This may have the effect of mitigating undesirable or unexpected behaviour at a sensor client. Unnecessary or undesirable data may be suppressed, reducing the load on the data broker and subscriber clients. The suppression of data may be temporary (e.g., applied only to the most recently-received data message) or persistent (e.g., by preventing the sensor client from establishing a connection with the data broker in future). By way of examples, the actions may relate to the processing of data received from a sensor client, the generation of new data or new control messages, the establishment or release of connections with clients, and/or the establishment or modification of subscriptions at one or more subscriber clients.

Multiple instances of the state machine may be initialised and maintained, each associated with a specific sensor client or group of sensor clients.

A state machine may be defined by a state machine definition, which defines the conditions for a given state transition, and any corresponding action or function to be applied.

State machines (having different state machine definitions) may be deployed to monitor and process data associated with sensor clients of different types. A single sensor client may fall within the scope of multiple state machines, so that the state of two or more state machines is modified based on data received from that client.

The state machine may be implemented as a Mealy state machine or as a Moore state machine. For the purposes of the present description, the state machine will be described as a Mealy state machine, without limiting the scope of the present disclosure.

Figure 5:
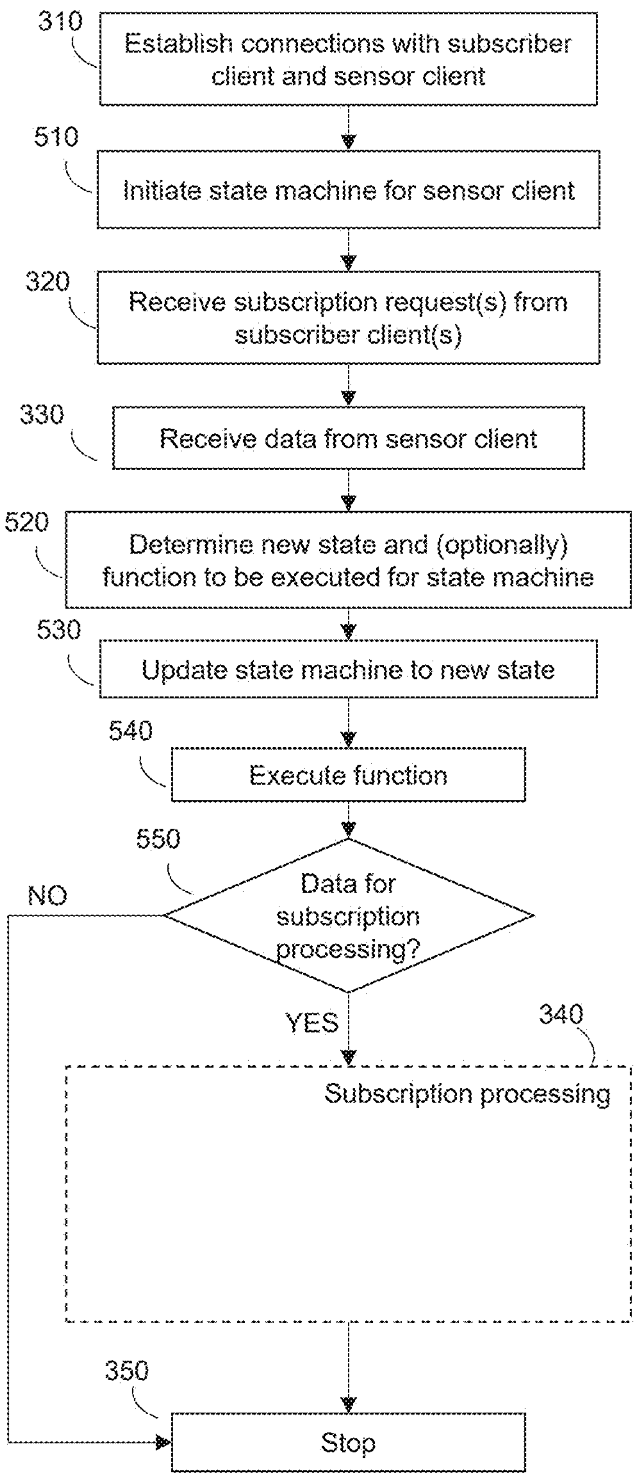
FIG. 5 is a flow chart illustrating a process for a processing data by a data broker, in accordance with examples.

FIG. 5 is a flow chart illustrating a process for a processing data by a data broker, in accordance with examples.

Steps of the process of FIG. 5 that are the same as corresponding steps in FIG. 3 are numbered identically, and their description is omitted here for conciseness.

The process of FIG. 5 starts at step 310, and continues with step 510.

At step 510, a state machine is initialised. As described further below, a state machine is associated with a scope, which defines which received messages are used to determine an updated state of the state machine. The scope may include published data messages. In the example of FIG. 5, the state machine is associated with all data published by a particular sensor client 140.

As further non-limiting examples, the scope may specify data transmitted by a particular sensor client, data transmitted by a group of sensor clients, or data associated with one or more <sensor client, topic> pairs. By way of another example, a state machine of data broker 120 may be associated with all of the sensor clients associated with a particular device, such as sensor clients 140*d*, 140*e* of device 410 shown in FIG. 4.

In the example of FIG. 5, the state machine is initialised at step 510 after the establishment of the logical connection 170 between the data broker 120 and the sensor client 140. In some examples, the state machine is initialised in response to the establishment of the logical connection 170. In some other examples, the state machine is initialised only when data within the scope of the state machine is received. In another example, the state machine is initialised when data within the scope of the state machine is received and the data is within the scope of at least one subscription. In some examples, the state machine is initialised prior to the establishment of the logical connection 170.

As part of the initialisation, a current state of the state machine is set to an initial state. For example, the state machine may perform a counting function, to count the number of data messages received from a client. In such a case, the state machine may be initialised to represent a counter value of zero.

Conditions for the initialisation of the state machine and an initial state of the state machine may be specified in a pre-configured state machine definition.

As in the process of FIG. 3, the data broker may maintain subscription records, each subscription associating a subscriber client 150 and a category of data. Accordingly, at step 320 one or more subscription requests may be received and processed. At step 330, a data message is received from the sensor client 140.

At step 520, a new state for the state machine is determined. The new state may be determined based on the receipt of the data message and the current state of the state machine. Optionally, a function to be executed may be determined based on the receipt of the data message and the current state of the state machine.

At step 530, the current state of the state machine is updated to the new state determined at step 520.

If, at step 520 a function was determined then this may be executed at step 540. Examples of functions that may be executed here are described below. Examples of functions include discarding the data message and generating new data.

At step 550, the data broker 120 determines whether, as a result of any function executed at step 540, there exists any data message which is to be subject to subscription processing. If data broker 120 determines that there is no data to be subject to subscription processing ('NO') then control passes to step 480 and the process ends. The data broker 120 may determine that there is no data to be subject to subscription processing if, for example, the function of discarding the received data message is executed at step 540, and no new data is generated.

If, at step 550, the data broker 120 determines that there is data to be subject to subscription processing ('YES'), then control passes to step 340. The details of step 340 are omitted from FIG. 5 for clarity, but they may be as described above for the process shown in FIG. 3. This may include, for example, generating a copy of the data for each subscriber having a subscription to the data, adding the copy to a processing queue, and transmitting each copy to the respective subscriber. Control then passes to step 480 and the process ends.

Steps of the process may be repeated. In particular, the process may be re-started from step 330 when further data within the scope of the state machine is received.

Steps of the process may be omitted, or performed in a different order. Steps may be implemented in parallel. In particular, for example, steps 530 and 540 may be implemented in any order or in parallel.

Further examples of the state machine and its operation will now be described.

As described above, in examples of the present disclosure, a state machine is associated with a pre-configured scope, which defines a set of messages received from one or more sensor clients which may result in an update to the state of the state machine.

The scope includes certain data messages published by sensor clients. The scope may be characterized by one or more of the following:

- One or more topic definitions
- One or more sensor clients
- One or more devices which each include one or more sensor clients.

A topic definition may define a single topic or a set of topics. For example, where topics are structured hierarchically, a topic definition may specify all topics within a particular branch of the hierarchy.

For example, sensor client 140*e* within the device 410 of FIG. 4 may generate temperature data and publish the data using topics organised hierarchically which include, in a temperature branch, "temperature-maximum", "temperature-minimum" and "temperature-external" topics. The scope of a state machine may be defined as all data published by the sensor client 140*e* any having a topic within the 'temperature' branch.

In another example, with reference to FIG. 1, the scope may be defined as all data published by sensor clients 140*a*, 140*b*, having the topic 'humidity' and data published by sensor client 140*d* having the topic 'speed'.

Published data which fall outside the scope of the state machine is not used to update the state machine or to determine any function which is to be executed.

The state machine scope may include control messages from one or more sensor clients. The sensor clients whose control messages fall within the scope of a state machine may be the same as, or different from, the sensor clients whose published data is within the scope of the state machine. For example, the scope of a state machine may be defined as all data published by the sensor client 140*e* and having a topic within the 'temperature' branch, and control messages relating to logical connection establishment, maintenance and release sent by sensor client 140*f*. In some examples, the scope includes certain control messages and does not include any data messages.

In a particular example, the scope of the state machine includes only messages sent by a single sensor client 140.

In a further example, the scope of the state machine includes only messages sent by multiple sensor clients 140*e*, 140*f*, the multiple sensor clients being parts of the same device 410.

In yet a further example, the scope of the state machine includes messages sent by multiple sensor clients 140*f* the multiple sensor clients being parts of different devices 410.

After the initialisation of the state machine, its state depends on the sequence of received messages within the scope of the state machine. The state machine is updated to a new state, and any determined function is executed, in dependence of the reception of such a message, and, optionally, on the current state of the state machine.

The state machine may be updated other than in response to the receipt of a message. For example, a state transition may occur in response to a timer expiry. The timer may have been started at a previous state transition.

A state transition results in the current state of the state machine being updated to a new state. The determination of the new (or 'updated') state may be based on the reception of a message within the scope of the state machine. The updated state may be the same as the current state. The data broker may determine the updated state based on one or more of the following:

- the current state of the state machine;
- the fact that a (any) message containing data within the scope of the state machine has been published and received at the data broker;
- the source (client) that published the message;
- a topic associated with the message; and
- the contents of the data.

The new state may also be determined based on the receipt of a control message within the scope of the state machine. For example, the state machine may be updated based on the receipt of a message establishing a connection with the broker, such as an MQTT CONNECT message.

Accordingly, the state of the state machine may represent aspects of the history of published data messages and/or received control message within the scope of the state machine. That is, the current state of the state machine may reflect the receipt of one or more messages within the scope of the state machine. For example, the state of the state machine may represent the total number of data messages within the scope of the state machine, published since the broker received an MQTT CONNECT message from a particular sensor client.

It will be appreciated that, while the current state of the state machine may reflect the previous receipt of one or more messages within the scope of the state machine, the current state does not necessarily reflect each and every message within the scope that has been received. For example, considering the example in which the state represents the total number of data messages within the scope, published since the broker received an MQTT CONNECT message, the state of the state machine does not depend on any data messages received prior to the receipt of the most recent MQTT CONNECT message.

In another example, the state machine state may represent a most recent data value published by a sensor client.

Where the scope of the state machine covers messages generated by multiple clients, the state of the state machine may reflect, jointly, the previous receipt by the data broker of published data and received control messages transmitted from multiple clients. For example, the state may (jointly) represent a number of 'humidity' messages published by a first sensor client since a most recent 'temperature' message was published by a second sensor client, and a most recent 'barometric pressure' value published by a third sensor client.

After the new state has been determined, the state machine is updated to the new state. In some examples, according to the state machine definition, no transition occurs from a particular state. Such a state may be referred to as a 'terminal' state. When the current state is a terminal state, the new state will always be the same as the current state, irrespective of any received data or control messages.

The determination of a function to be performed is made in dependence of one or more of the received data or control message, the current state of the state machine and a trigger (such as a timer expiry).

It may be determined that no function is to be performed. In this case, where the received message is a data message, it is processed according to the messaging protocol. This may comprise subscription processing. Where the received message is a control message, it may be processed in accordance with the messaging protocol. For example, where the control message is a connect message (such as an MQTT CONNECT message), the data broker may respond with a connection acknowledge message (such as a MQTT CONNACK message.

In some examples, it may be determined that multiple functions are to be performed.

Examples of functions that may be carried out in accordance with the state machine definition are functions which modify or process the received data (including discarding the data), generate new data or a new control message, or perform another control function as described further below.

Generated new data may be generated so as to appear to have been generated by the same sensor client (and optionally, associated with the same topic) as the data received at step 330, and may be subject to subscription processing step 340 accordingly, i.e., it may be forwarded to subscriber clients who have subscribed to receive the data received at step 330.

In some examples, the generated new data may be associated with a different source and/or topic, and may be processed at step 340 according to any subscriptions which apply to that source and topic. Accordingly, the generated new data may be forwarded to a different set of subscriber clients than the data received at step 330.

By the generation of new data messages, a subscriber client may be notified of particular circumstances which have been detected (at least in part) by virtue of the state of the state machine. This subscriber client may be one that does not subscribe to data messages within the scope of the state machine and may be, for example, a subscriber client which receives only output generated as a result of the functioning of the state machine.

In some examples, a new control message may be generated (or a control message may be generated which is different from that specified in the protocol). For example, according to the messaging protocol specification, a Connect message requesting a connection may trigger a positive acknowledgement indicating a successful connection establishment. An example of a positive acknowledgement is an MQTT CONNACK message indicating that the connection establishment is successful. In an example function of the state machine, in response to the Connect message, an acknowledgement message (e.g. MQTT CONNACK) is generated which indicates that the connection request is not successful. Alternatively, no such acknowledgement message is sent.

In some examples, a function of the state machine is to modify, terminate or establish a connection. For example, a control message may be generated which indicates that a current connection is to be terminated. The current connection may be between the data broker and the client which transmitted the message triggering the state update, or between the data broker and another client.

In an example, referring to FIG. 4, a state machine may have a scope corresponding to data messages published by sensor clients 140*e*, 140*f* of device 410. The state machine may, based on received data messages, determine that a function to be performed is to terminate the logical connections 170*e*, 170*f*, 170*g* between the data broker 120 and sensor clients 140*e*, 140*f* and subscriber client 155.

In some examples, the data broker may modify, create, or delete a subscription record associated with a particular client. Subscription processing of subsequently published data may be performed in accordance with the resulting (if any) subscription record. The particular client may different from the client which transmitted the message triggering the function.

In some examples, the received message is discarded. As such, where it is a data message, it is not subject to subscription processing 340 and therefore is not forwarded to subscriber clients who would, but for the discarding, receive the message. Where the message is a control message, any processing specified by the messaging protocol is not carried out.

Accordingly, the state machine in combination with these functions may selectively discard received data or control messages. This can reduce the processing load on the data broker and avoid unwanted or unnecessary data being transmitted across the communications network towards any subscriber. In a particular example, where the state of the state machine is indicative of a most-recently received data value, and when the received data message contains a value which is identical to the most-recently received value indicated by the state machine, the data broker may determine to discard the received data message, thereby preventing the publication of messages indicating identical data.

Other control functions may relate to the collection of statistics or updating of an event log. For example, the data broker may maintain an event log, and a function of the state machine may be to update the event log with a suitable record. The event log may be queried by a user, for example via an application programming interface (API) provided at the data broker 120. The event log may be specific to the state machine, or may be used to gather information regarding multiple state machines.

Similarly, the data broker may maintain statistics regarding the operation of the sensor clients. A function may trigger the updating of these statistics.

In other example functions, a particular status associated with a particular client or device is stored. For example, a function may include storing an IP address or other identifier of a particular client or device, and associating that identifier with a 'blocked client' status. The data broker may subsequently receive a request to establish a TCP/IP or other transport layer connection, or an end-to-end logical connection (such as an MQTT connection) with the client or device and, based on the stored status associated with the IP address or identifier, decline to establish the requested connection.

In some examples, the function is applied in respect of the client which transmitted the message triggering the function. In some examples, the function is applied in respect of one or more clients other than the client which transmitted the message. For example, in response to receiving a number of published data messages from a first client, the data broker may modify the subscription status of a different client, so that the different client is then subscribed to receive subsequent messages published by the first client.

Each of steps 520 (determination of the new state and function), 530 (update of the state machine) and 540 (execution of function) may be carried out directly in response to the reception of a message. Alternatively, one or more of these steps may be performed in response to, but asynchronously with, to the reception of the message. In an example of an asynchronous update, a received message is stored in a buffer and subsequently processed to determine the updated state of the state machine and any function to be performed. In some examples, when a state machine is initialised, a specific message queue is initialised, and messages (or copies of the messages) within the scope of the state machine are stored in the queue for subsequent processing.

A state machine update may result in no change to the state of the state machine. For example, where different states are associated with a respective number of received published data messages, the state machine may have a single state to represent three or more received published data messages. When in this state, after receiving a further published data message, the state machine remains in the same state.

State machine initialisation and/or state machine updates based on received published data may occur independently of the existence of a current subscription for that data. Accordingly, in some examples, when a request is received at the data broker from a subscriber client to subscribe to, or unsubscribe from, published data, no update is made to a state machine, even if the receipt of published data within the scope of the subscription would trigger an update to the state machine.

The state machine may remain active only while an end-to-end connection 170 to the sensor client whose messages are within the scope of the state machine remains established. Alternatively, where the scope of the state machine includes data from multiple sensor clients, the state machine may remain active only while a connection 170 to any one of (or to at least a specified one of) the sensor clients.

In some examples, the state machine may persist (that is, its current state is maintained) even when no connection 170 exists to any sensor client whose messages are within the scope of the state machine. Accordingly, the state machine state may reflect historical data or control messages received prior to the establishment of a current connection 170.

As described above, the data broker 120 may receive published data from many different sensor clients. A state machine instance may be initialised whose scope corresponds to a first subset of these clients. Multiple state machine instances may be initialised, where each of the state machine instances has a scope corresponding to a different respective subset of clients. Some or all of these state machine instances may operate according to a common state machine definition.

In some examples, data from a sensor client may be within the scope of two or more state machines. In such examples, steps 520, 530 and 540 may be executed in respect of the same data for each of the two or more state machines.

For example, a state machine definition may define a state machine to be initialised having a scope of all sensor clients within an instance of a specific device 410 of a particular type. For example, the particular type of device may correspond to a model of vehicle, and a state machine may have a scope of multiple sensors within a single vehicle of that model. The data broker 120 may initialise multiple instances of the same state machine, each state machine having in its scope sensors within a single vehicle.

An example of the use of a state machine, in accordance with example embodiments of the present disclosure, in a system where a sensor client is expected to generate data messages in a particular sequence will now be described.

In this example, a sensor client is expected to transmit data messages of three types, referred to as type 'M', type 'S' and type 'U'. These types may be associated with particular respective topics, and/or with particular data values within the message. According to a desired mode of operation for the sensor client, no messages of type 'S' are permitted after messages of type 'U'.

A state machine may be initialised in accordance with a state machine definition to have two states: state 1, which represents the case where no messages of type 'U' have been received; and state 2, where one or more message of type 'U' have been received. The scope of the state machine is data messages received from the (single) sensor client.

In both state 1 and state 2, on receipt of a message of type 'M', there is no state change and no function is executed; the type 'M' message is subject to subscriber processing in the normal manner.

In state 2, on receipt of a message of type 'U', there is no state change and no function is executed. Similarly, in state 1, on receipt of a message of type 'S' there is no state change and no function is executed.

In state 1, on receipt of a message of type 'U', there is a state change to state 2, but no function is executed.

In state 2, on receipt of a message of type 'S', there is no state change, however a function to discard the message of type 'S' is executed. Accordingly, the received message is not subject to subscriber processing.

By implementing this state machine at the data broker, messages of type 'S' which are received from the sensor client are discarded and not forward to any subscribers, if (and only if) they are received after an earlier message of type 'U' has been received. Accordingly, the data broker is able to enforce a desired protocol in respect of the sequencing of messages received at a subscriber.

A further example of the use of a state machine to suppress unwanted or undesirable signalling within the communications network and thereby reduce processing load at the data broker 120 will now be described.

In this example, states of the state machine reflect a number of data messages published by a client since a most recent connection establishment. In particular, one state indicates that at least N_min data messages have been published; and a further N_min states respectively indicate that 0 to N_min-1 data messages have been published by the client.

In response to the receipt of a Connection request message, the data broker checks whether the client has previously been identified as a blocked client; for example, the data broker may compare an identity of the client to identities on a blocked client list. If the client is a blocked client, the connection request is refused. Otherwise, the connection is established and the state machine transitions to the state representing zero data messages. In response to the subsequent receipt of data messages, the state machine progressively transitions to the states representing 1 data message, then 2 data messages, and so on. If the current state corresponds to N_min data messages, then no further state transition occurs in response to a further data message.

If a Connection release request is received when the current state is anything other than the state corresponding to N_min, then it is determined that client is a blocked client. The client's identity (e.g., its IP address) may be added to the 'blocked client' list, or the status of the client as a blocked client is otherwise stored.

In this way, sensor clients which connect to the data broker and publish fewer than N_min data messages before disconnecting, and therefore result in a relatively high number of control messages being transmitted in comparison to the number of published data messages can be prevented from connecting to the data broker in future, thereby reducing the processing load at the data broker, and improving the efficiency of the system.

A further example of the use of a state machine to enforce desired behaviour of a collection of sensor clients (for example, associated with a single device such as a vehicle) will now be described. In this example, the scope of a state machine covers multiple sensor clients. These clients are expected to transmit sensor data, which, jointly, can be used to assess an overall status of the device. However, if one or more sensor clients are not operational and are not publishing data, the value of the remaining data is significantly diminished.

In this example, the state machine reflects, jointly, the current connection state of each of the sensor clients, and whether or not each of the clients has published at least one data message. At least one state reflects that all of the clients are connected and that all of the clients have each published at least one data message since most recently connecting. Only in this state are data messages subject to subscription processing; in all other states, all data messages are discarded.

Optionally, this state machine may also reflect that a predetermined number (e.g., 100) of data messages have been discarded, and update an event log (such as an event log file) when this threshold is reached. The event log may be queried via an API, or may be formed into a data message to be published to subscribers clients that have subscribed to the appropriate messages.

Figure 6:
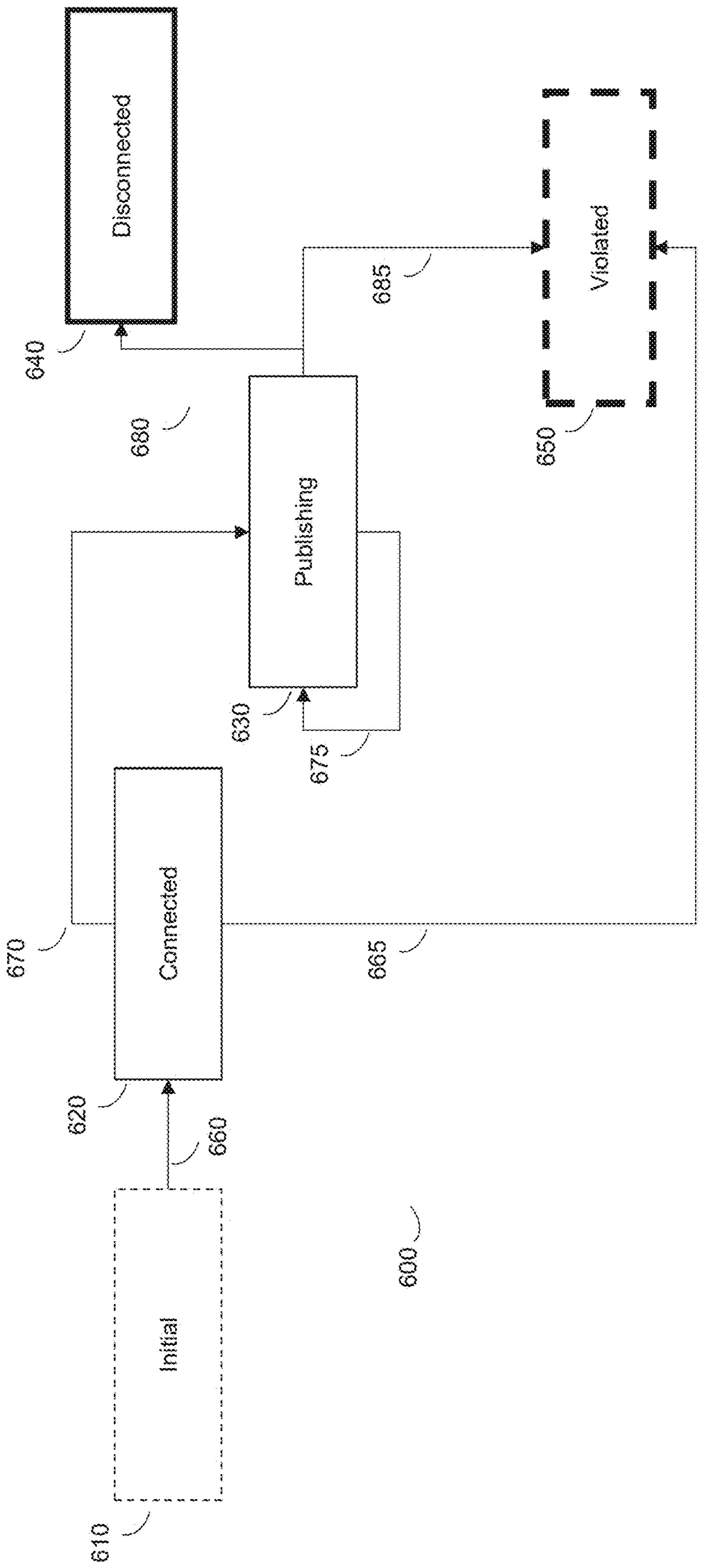
FIG. 6 is a transition diagram for a state machine in accordance with examples.

FIG. 6 is a transition diagram for a state machine 600 in accordance with examples. The state machine 600 comprises states 610, 620, 630, 640, 650 and transitions 660, 665, 670, 675, 680, 685, and, when implemented at the data broker 120, tracks a number of PUBLISH messages a client sends after a client connects to the data broker, to identify unusual behaviour. Unusual behaviour can include a client sending too few or too many messages before disconnecting.

Detecting a client that sends too few messages is particularly useful to identify clients that follow a pattern of connecting, publishing a single message, and disconnecting. If this pattern occurs repeatedly at scale it can inflict unnecessary strain on infrastructure resources in the communications networks, at the data broker, and at downstream services.

The Initial state 610 is the starting point of the model which is entered as soon as a client establishes a transport layer connection with the data broker 120; for example, the client may be one that has established a TCP/IP connection using an address which matches a predetermined criteria associated with the state machine.

Connected state 620 indicates that the client has successfully connected to the broker. That is, it has established a point-to-point connection using a handshake, such as by using the MQTT CONNECT and CONNACK messages. It is entered via transition 660.

Publishing state 630 is entered when the client sends the first PUBLISH message (via transition 670 from the Connected state), and the client remains in this state for each consecutive PUBLISH (via transition 675) until it disconnects or violates the specified behaviour.

Violated state 650 is entered via transition 665 or transition 685 when the client disconnects after sending too few PUBLISH messages, or (via transition 685) when a connected client sends too many PUBLISH messages.

Disconnected state 640 is entered via transition 680 when the client disconnects after sending the configured amount of PUBLISH messages.

In an example, the scope of the state machine is set to apply to a single client, and multiple instances of the state machine are maintained, in respect of different respective clients. Each state machine thus enforces a behaviour model. A state machine may be configurable with a predetermined value to specify the minimum number of publishes, minPublishes. In an example, this is set to 2, indicating that the model will verify that the client sends a minimum of 2 PUBLISH messages. The maximum allowed number of PUBLISH messages may be unrestricted.

In an example, on entry to the Violated state 650, a message is logged and a metric is incremented to track the total number of clients that violate the behaviour.

It will be appreciated that the description of specific state machines herein is for illustrative purposes and that other state machines may be implemented to give rise to the execution of the same functions, in the same conditions, as those described herein.

At least some aspects of the examples described herein comprise computer processes or methods performed in one or more processing systems and/or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general, etc.

Figure 7:
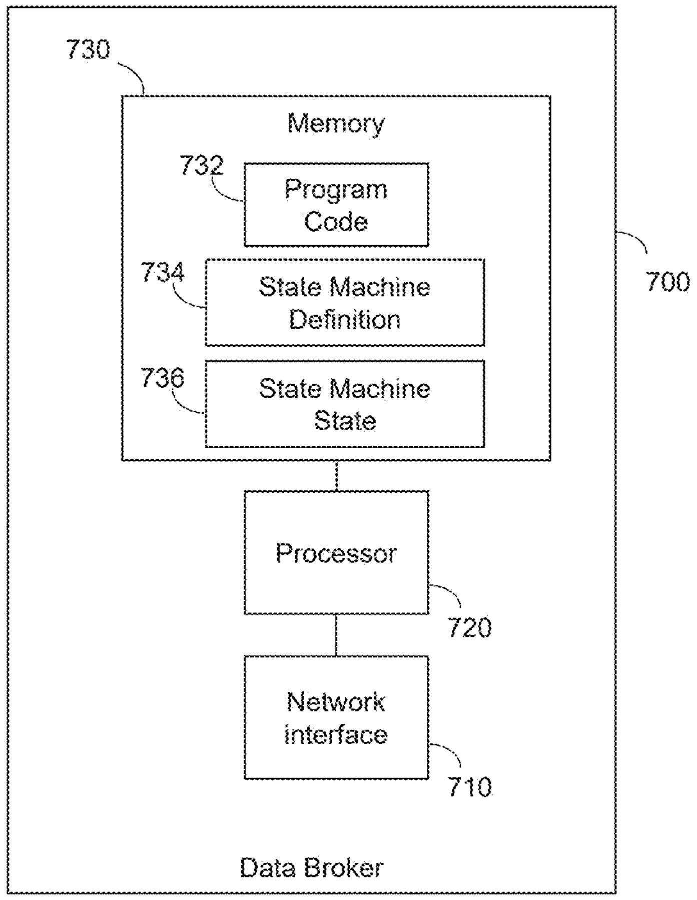
FIG. 7 is a simplified block diagram of a device in accordance with examples.

FIG. 7 is a simplified block diagram of a device 700 in accordance with examples. The device 700 may be provided to implement the data broker 120 as shown in FIG. 1. As shown, the device 700 includes processor 720, memory 730 and network interface 710 coupled to the processor 720. The network interface 710 is for bidirectional communication and may include at least one antenna. The memory 730 may comprise a storage medium on which is stored computer program code 732 for a computer program in accordance with examples described herein. The memory 730 also stores a state machine definition 734 and state machine state 736. In some examples, as described above, there may be multiple state machines in operation, in which case the memory 730 comprises multiple corresponding instances of state machine state 736, each reflecting the respective state of the corresponding state machine.

In some examples, as described above, the data broker 120 may be configured to maintain state machines in accordance with different state machine definitions, in which case the memory 730 may comprise multiple corresponding instances of state machine definition 736.

The processor 710 may be of any type suitable and may include general purpose computers, application-specific integrated circuits, as non-limiting examples. In some examples, the device 700 may have multiple processors.

In some examples, the data broker 120 may be implemented using a plurality of devices 700 in a distributed architecture, in which the plurality of devices 700 cooperate. In some examples, one or more of the state machine definition 734 (or instances thereof) and state machine state 736 (or instances thereof) may be stored on memory in a different device from the device 700. The device 700 may retrieve or update state machine state, or may obtain a state machine definition by means of communications with the different device, for example by means of the network interface 710.

The above embodiments are to be understood as illustrative examples. Further embodiments are envisaged. For example, systems as discussed herein may be deployed in other configurations and scenarios in which generated messages may be received in a manner which is unexpected or undesirable.

For example, the above examples refer to sensor clients and sensor data. In other examples other types of data may be published by sensor clients or other types of clients.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

Examples of the present disclosure may be in accordance with the following numbered paragraphs.

Paragraph 1. A method performed at a data broker, the method comprising:

- receiving from a subscriber client a request for a subscription for sensor data transmitted by a first sensor client, the request in accordance with a publish/subscribe messaging protocol,
- receiving first sensor data from the first sensor client, the first sensor data published by the first sensor client in accordance with the messaging protocol, determining, in dependence on the first sensor data and a current state of a state machine associated with the first sensor client, whether the first sensor data is to be subject to subscription processing, determining, in dependence on the receipt of the first sensor data and the current state of the state machine, an updated state for the state machine, updating the state machine to the updated state, and if the first data is to be subject to subscription processing, forwarding the data to the subscriber client in accordance with the messaging protocol.

Paragraph 2. A method performed at a data broker, the method comprising:

receiving a message from a client in accordance with a publish/subscribe messaging protocol, determining whether the message is within a category of messages associated with a state machine, wherein a current state of the state machine reflects the previous reception by the data broker of one or more messages within the category of messages, if the message is within the category of messages then determining, based on the receiving the message, an updated state for a state machine and a function to be executed, updating the state machine to the updated state, and performing the function.

Paragraph 3. A method according to paragraph 2, wherein the function to be executed comprises one or more of:

generating a new message comprising data, subscription processing of the new data message in accordance with the publish/subscribe messaging protocol, discarding, without performing subscription processing, the received message, generating and transmitting to the client, other than in accordance with the publish/subscribe messaging protocol, a control message defined by the publish/subscribe messaging protocol, modifying, creating or removing a subscription record, associating a status with the client, transmitting to another client another data message or another control message, and updating a log.

Paragraph 4. A method according to paragraph 3, wherein when the received message is a published data message associated with a first topic, and the function comprises generating a new message comprising data, a topic associated with the new message differs from the first topic.

Paragraph 5. A method according to any of paragraphs 2 to 4, wherein the method further comprises:

if the received message is not within the category of messages, determining whether the received message is a published data message, and if the received message is a published data message, then performing subscription processing of the received message in accordance with the publish/subscribe messaging protocol, irrespective of the state of the state machine.

Paragraph 6. A method according to any of paragraphs 2 to 5, wherein the subscription processing of a data message in accordance with the publish/subscribe messaging protocol, the data message being the new data message or the received message, comprises:

determining that a subscriber client has requested a subscription, the scope of which includes the data message, generating a data message for publication in accordance with the publish/subscribe message protocol based on the data message, and transmitting the generated data message for publication to the subscriber client.

Paragraph 7. A method according to any of paragraphs 2 to 6, wherein the updated state for the state machine is determined based on one or more of:

the determination that the message is within the category of messages;

whether the message contains published data or is a control message;

an identity of the client that transmitted the message;

when the message is a control message, a type of the control message, when the message contains published data, a topic associated with the data; and when the message contains published data, the contents of the data.

Paragraph 8. A method according to any of paragraphs 2 to 7, wherein the category of messages associated with the state machine comprises data messages published by the client in accordance with the publish/subscribe messaging protocol.

Paragraph 9. A method according to any of paragraphs 2 to 8, wherein the category of messages associated with the state machine excludes data messages, published by the client in accordance with the publish/subscribe messaging protocol, which are not associated with one or more topics.

Paragraph 10. A method according to any of paragraphs 2 to 9, wherein the category of messages associated with the state machine comprises control messages transmitted by the client in accordance with the publish/subscribe messaging protocol.

Paragraph 11. A method according to any of paragraphs 2 to 10, wherein the category of messages associated with the state machine comprises messages transmitted by an additional client in accordance with the publish/subscribe messaging protocol.

Paragraph 12. A method according to any of paragraphs 1 to 11, the method further comprising:

initiating the state machine in accordance with a pre-configured state machine definition, wherein the pre-configured state machine definition specifies one or more of the category of messages associated with the state machine;

an identity of the client;

a list of criteria for state transitions of the state machine, each criteria associated with a state transition from a first state of the state machine to a second state of the state machine; and one or more function definitions, each associated with a respective one or more state transitions.

Paragraph 13. A method according to paragraph 12, the method further comprising:

receiving a description of the pre-configured state machine definition.

Paragraph 14. A method according to paragraph 12 or paragraph 13, wherein the initiating the state machine is in response to one of:

receiving a message within the category of messages associated with a state machine; and establishing a connection with the client.

Paragraph 15. A method according to any preceding paragraph, the method further comprising:

determining that a connection with the client has been disconnected, and maintaining the current state of the state machine while the client is in a disconnected state.

Paragraph 16. A method according to any preceding paragraph, wherein the publish/subscribe messaging protocol is one selected from a group of protocols comprising MQTT version 5.0, MQTT version 3.1.1, MQTT-SN version 1.2, MQTT-SN version 2.0, or is a updated version of any one of the group of protocols.

Paragraph 17. A data broker apparatus, comprising:

a network interface, a processor, and a memory, the memory having stored upon it instructions which, when executed, cause the data broker apparatus to carry out the method of any of paragraphs 1 to 16.

The invention claimed is:

1. A method performed at a data broker, the method comprising:

receiving from a subscriber client a request for a subscription for sensor data transmitted by a first sensor client, the request in accordance with a publish/subscribe messaging protocol, receiving first sensor data from the first sensor client, the first sensor data published by the first sensor client in accordance with the messaging protocol, determining, in dependence on the first sensor data and a current state of a state machine associated with the first sensor client, whether the first sensor data is to be subject to subscription processing, determining, in dependence on the receipt of the first sensor data and the current state of the state machine, an updated state for the state machine, updating the state machine to the updated state, and if the first data is to be subject to subscription processing, forwarding the data to the subscriber client in accordance with the messaging protocol.

2. A method performed at a data broker, the method comprising:

receiving a message from a client in accordance with a publish/subscribe messaging protocol, determining whether the message is within a category of messages associated with a state machine, wherein a current state of the state machine reflects the previous reception by the data broker of one or more messages within the category of messages, if the message is within the category of messages then determining, based on the receiving the message, an updated state for a state machine and a function to be executed, updating the state machine to the updated state, and performing the function.

3. A method according to claim 2, wherein the function to be executed comprises one or more of:

generating a new message comprising data, subscription processing of the new data message in accordance with the publish/subscribe messaging protocol, discarding, without performing subscription processing, the received message, generating and transmitting to the client, other than in accordance with the publish/subscribe messaging protocol, a control message defined by the publish/subscribe messaging protocol, modifying, creating or removing a subscription record, associating a status with the client, transmitting to another client another data message or another control message, and updating a log.

4. A method according to claim 3, wherein when the received message is a published data message associated with a first topic, and the function comprises generating a new message comprising data, a topic associated with the new message differs from the first topic.

5. A method according to claim 2, wherein the method further comprises:

if the received message is not within the category of messages, determining whether the received message is a published data message, and if the received message is a published data message, then performing subscription processing of the received message in accordance with the publish/subscribe messaging protocol, irrespective of the state of the state machine.

6. A method according to claim 2, wherein the subscription processing of a data message in accordance with the publish/subscribe messaging protocol, the data message being the new data message or the received message, comprises:

determining that a subscriber client has requested a subscription, the scope of which includes the data message, generating a data message for publication in accordance with the publish/subscribe message protocol based on the data message, and transmitting the generated data message for publication to the subscriber client.

7. A method according to claim 2, wherein the updated state for the state machine is determined based on one or more of:

the determination that the message is within the category of messages;

whether the message contains published data or is a control message;

an identity of the client that transmitted the message;

when the message is a control message, a type of the control message, when the message contains published data, a topic associated with the data; and when the message contains published data, the contents of the data.

8. A method according to claim 2, wherein the category of messages associated with the state machine comprises data messages published by the client in accordance with the publish/subscribe messaging protocol.

9. A method according to claim 2, wherein the category of messages associated with the state machine excludes data messages, published by the client in accordance with the publish/subscribe messaging protocol, which are not associated with one or more topics.

10. A method according to claim 2, wherein the category of messages associated with the state machine comprises control messages transmitted by the client in accordance with the publish/subscribe messaging protocol.

11. A method according to claim 2, wherein the category of messages associated with the state machine comprises messages transmitted by an additional client in accordance with the publish/subscribe messaging protocol.

12. A method according to claim 1, the method further comprising:

initiating the state machine in accordance with a pre-configured state machine definition, wherein the pre-configured state machine definition specifies one or more of the category of messages associated with the state machine;

an identity of the client;

a list of criteria for state transitions of the state machine, each criteria associated with a state transition from a first state of the state machine to a second state of the state machine; and one or more function definitions, each associated with a respective one or more state transitions.

13. A method according to claim 12, the method further comprising:

receiving a description of the pre-configured state machine definition.

14. A method according to claim 12, wherein the initiating the state machine is in response to one of:

receiving a message within the category of messages associated with a state machine; and establishing a connection with the client.

15. A method according to claim 1, the method further comprising:

determining that a connection with the client has been disconnected, and maintaining the current state of the state machine while the client is in a disconnected state.

16. A method according to claim 1, wherein the publish/subscribe messaging protocol is one selected from a group of protocols comprising MQTT version 5.0, MQTT version 3.1.1, MQTT-SN version 1.2, MQTT-SN version 2.0, or is a updated version of any one of the group of protocols.

17. A data broker apparatus, comprising:

a network interface, a processor, and a memory, the memory having stored upon it instructions which, when executed, cause the data broker apparatus to carry out the method of claim 1.

* * * * *